United States Patent [19]
Caveney

[11] Patent Number: 5,661,840
[45] Date of Patent: Aug. 26, 1997

[54] OPTICAL FIBER JUNCTION BOX CONNECTION

[76] Inventor: Jack E. Caveney, 546 Dalewood La., Hinsdale, Ill. 60521

[21] Appl. No.: 588,949

[22] Filed: Jan. 19, 1996

[51] Int. Cl.⁶ ..................................................... G02B 6/00
[52] U.S. Cl. ............................................................. 385/135
[58] Field of Search ..................................... 385/134–139, 385/147

[56] References Cited

U.S. PATENT DOCUMENTS

| | | | |
|---|---|---|---|
| 4,443,031 | 4/1984 | Borsh et al. | 285/419 |
| 4,898,448 | 2/1990 | Cooper | 385/135 |
| 5,127,082 | 6/1992 | Below et al. | 385/135 |
| 5,375,185 | 12/1994 | Hermsen et al. | 385/135 |
| 5,420,956 | 5/1995 | Grugel et al. | 385/135 |
| 5,421,532 | 6/1995 | Richter | 385/135 |
| 5,428,705 | 6/1995 | Hermsen et al. | 385/135 |
| 5,450,518 | 9/1995 | Burek et al. | 385/135 |
| 5,457,763 | 10/1995 | Kerry et al. | 385/135 |
| 5,490,229 | 2/1996 | Ghandeharizadeh et al. | 385/135 |

*Primary Examiner*—Akm E. Ullah
*Attorney, Agent, or Firm*—Mark D. Hilliard; Robert A. McCann

[57] ABSTRACT

An optical fiber junction box includes a wall having an entry slot at least partially defined by spaced apart edges; and a conduit for enclosing an optical fiber having a plurality of radial grooves, wherein an outer diameter of at least one of the radial grooves is approximately equal to a distance between the spaced apart edges such that the conduit is secured to the junction box when the spaced apart edges of the entry slot are positioned in one of the radial grooves of the conduit.

7 Claims, 5 Drawing Sheets

OPTICAL FIBER JUNCTION BOX CONNECTION

TECHNICAL FIELD

The present invention relates generally to junction boxes, patch panel trays or the like for optical fiber where the optical fibers are positioned for connection to other optical fibers. Specifically the present invention relates to an improved means for positioning the optical fibers relative to the junction box to prevent damage to the optical fibers.

BACKGROUND ART

As can be seen in FIG. 10 of U.S. Pat. No. 5,127,082 to Below et al., it has been proposed that individual optical fibers may be secured to a fiber optic patch panel by cable ties 108.

Securing the individual fiber optic cables in this manner requires time consuming manipulation of a cable tie fastener to secure additional individual fibers and risks damage to the fragile optical fibers due to strain on the fibers. Additionally, this type of connection does not provide any means to limit the angle at which the optical fibers are bent as they enter the patch panel. Bending the fibers at too sharp of an angle results in damage to the fibers. It is known to enclose optical fibers within corrugated plastic conduit which prevents the enclosed fiber from being bent beyond a specified radius to prevent damage to the optical fiber.

Thus, there is a need in the art for an improved means and method of securing optical fibers relative to a junction box or patch panel in a simple and effective manner while improving the protection on the fragile optical fibers.

SUMMARY OF THE INVENTION

It is the object of the present invention to provide an improved fiber optic fiber junction box and method of positioning fiber optic cables relative to the junction box which effects simple, efficient and secure placement of the optical fibers relative to the junction box while preventing damage to the optical fibers.

In general an optical fiber junction box includes a wall having an entry slot at least partially defined by spaced apart edges; and a conduit for enclosing an optical fiber having a plurality of radial grooves, wherein an outer diameter of at least one of the radial grooves is approximately equal to a distance between the spaced apart edges such that the conduit is secured to the junction box when the spaced apart edges of the entry slot are positioned in one of the radial grooves of the conduit.

In general the method of positioning optic fibers relative to a junction box includes the steps of providing an entry slot in a wall of the box; providing a fiber optic conduit having a plurality of radial grooves sized to fit snugly within the slot; and positioning the spaced apart edges of the entry slot in one of the radial grooves of the conduit to securely engage conduit with the wall of the box.

DESCRIPTION OF THE PREFERRED EMBODIMENT

Figure 1:
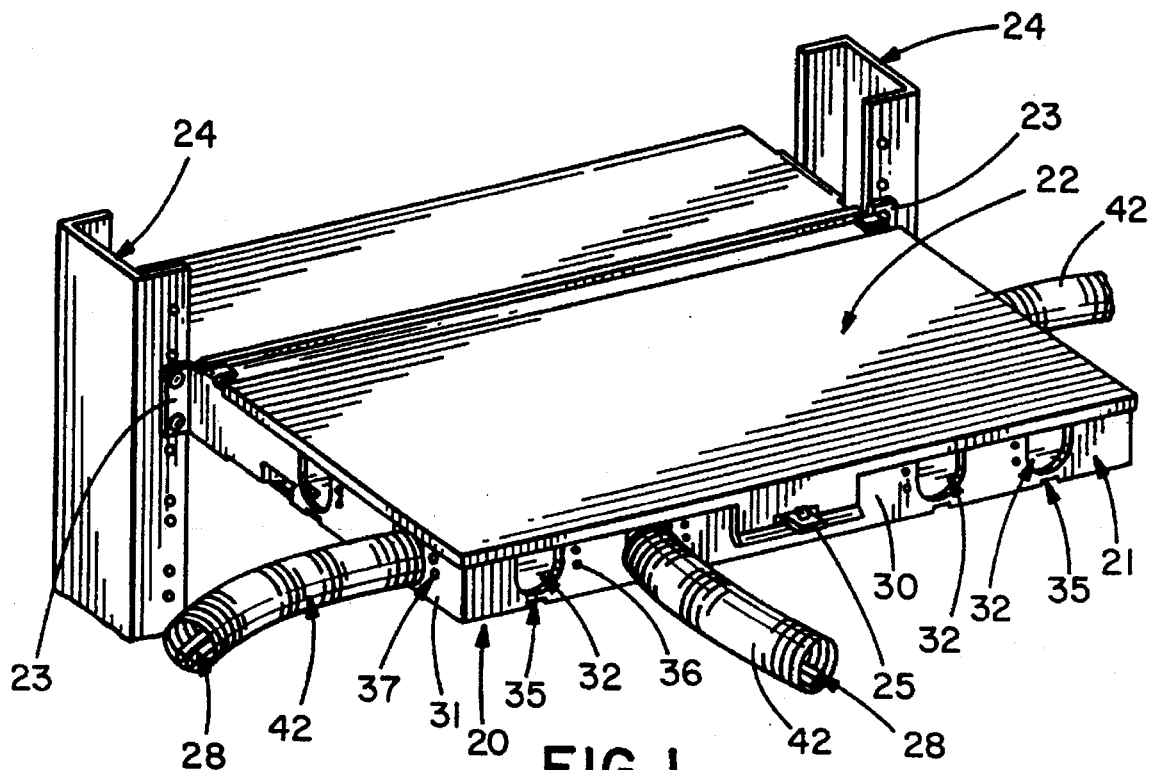
FIG. 1 is a perspective view of a optical fiber junction box or patch panel tray embodying the concept of the present invention.
Figure 2:
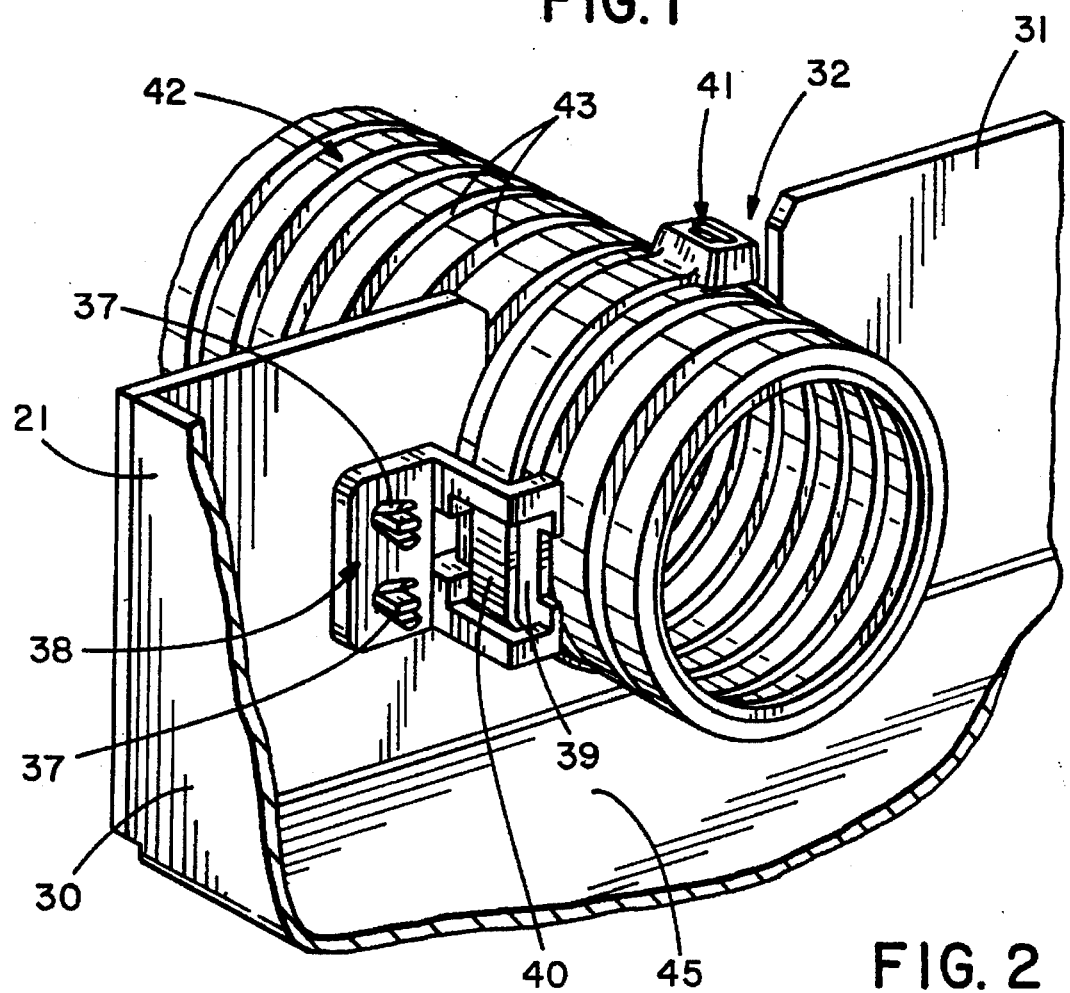
FIG. 2 is a fragmentary perspective view of the connection between the corrugated conduit and the patch panel tray wall of the patch panel tray of FIG. 1.

A optical fiber junction box or patch panel tray embodying the concept of the present invention is designated by the numeral 20 in the accompanying drawings.

Tray 20 includes a base 21 and a removable lid 22. Base 21 includes integral flanges 23 for attachment of base 21 to vertical patch panel support members 24. A latch 25 secures lid 22 to base 21.

Figure 3:
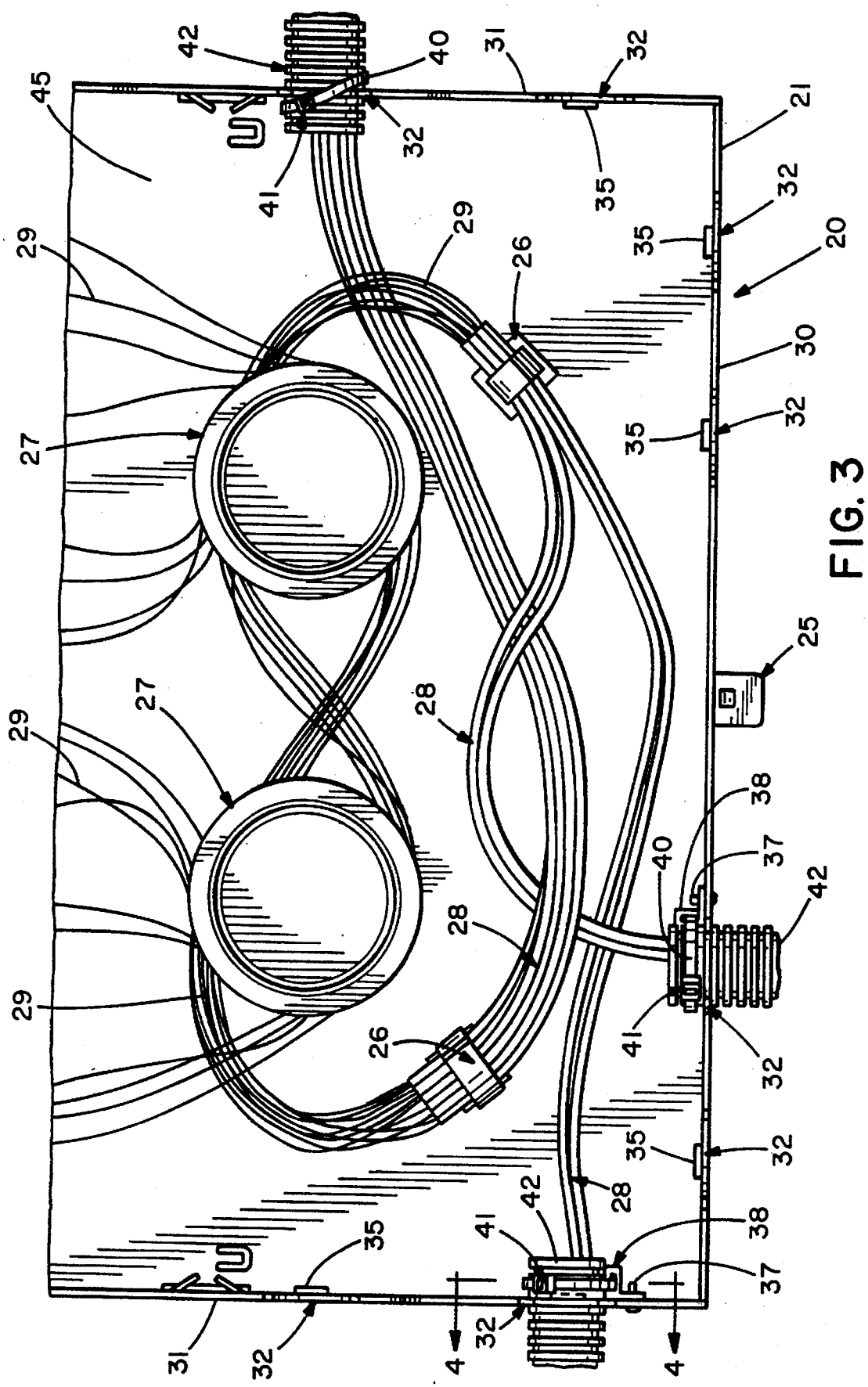
FIG. 3 is a fragmentary top view of the patch panel tray of FIG. 1, with the cover of the tray removed.

As seen in FIG. 3, the inner surface of tray base 21 includes removable clips 26 and spools 27 for positioning and arranging fiber optic cables 28 and individual optic fibers 29 within the tray 20.

Figure 6:
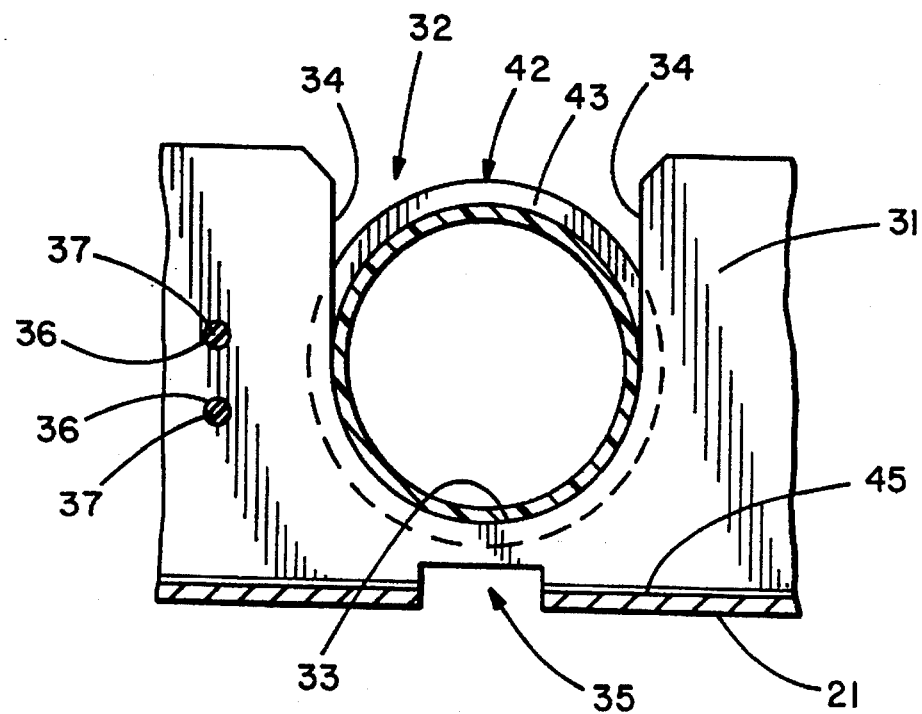
FIG. 6 is a sectional view taken along line 6—6 of FIG. 5.
Figure 7:
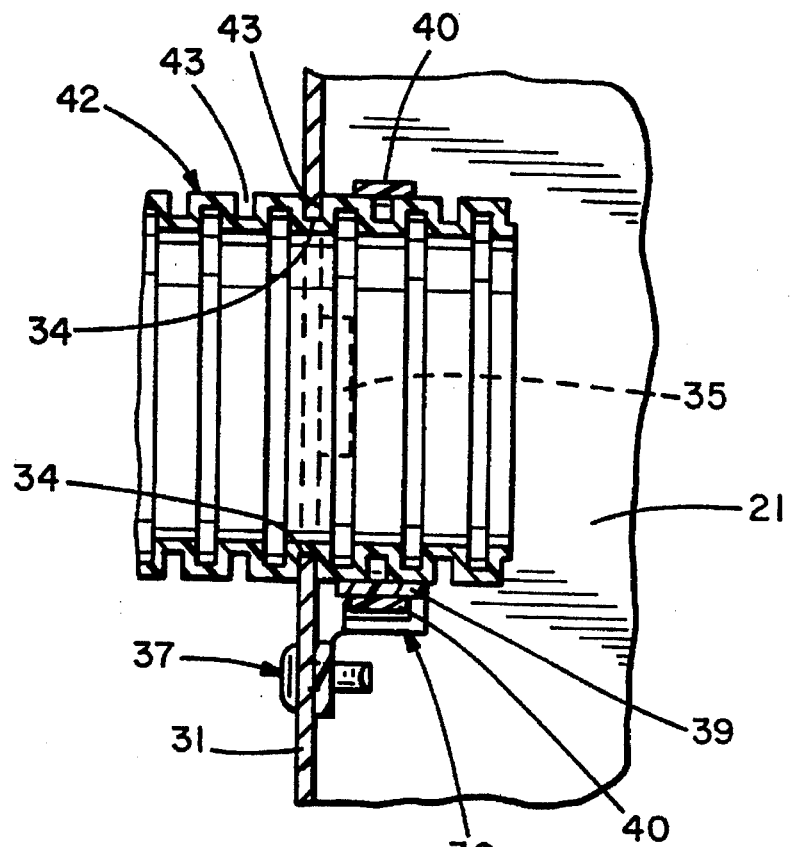
FIG. 7 is a fragmentary sectional view taken along line 7—7 of FIG. 4.

Base 21 is preferably formed of metal and includes a vertical back wall 30 and vertical side walls 31. Provided in back and side walls 30 and 31 are a plurality of entry slots 32. As seen in FIG. 6, entry slots 32 include a radiused inner edge 33 and vertical edges 34. As seen in FIGS. 1–8, disposed below each entry slot 32 is a cable tie receiving slot 35. Disposed adjacent each entry slot 32 are a pair of holes 36, see FIG. 6, for accepting fasteners 37, see FIG. 2, to secure a cable tie positioning fixture 38 adjacent each entry slot 32.

Figures 4, 5:
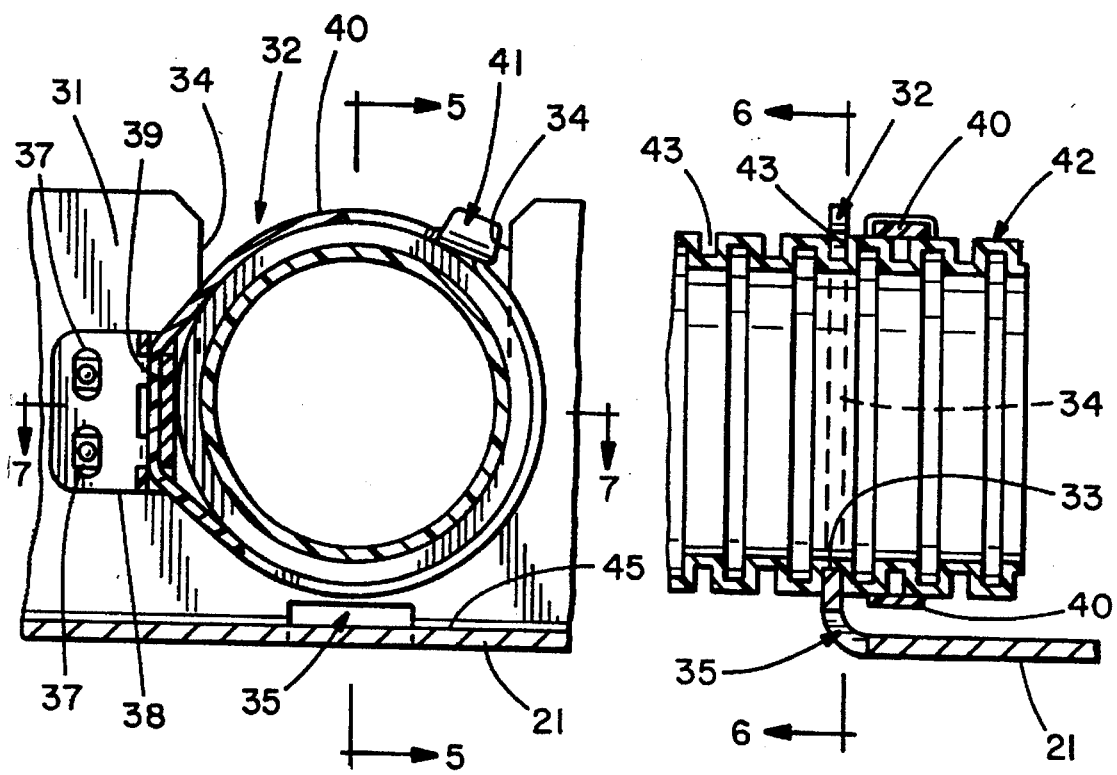
FIG. 4 is a fragmentary sectional view of the tray of FIG. 1 taken along line 4—4 of FIG. 3.
FIG. 5 is a fragmentary sectional view taken along line 5—5 of FIG. 4.

As seen in FIG. 4, cable tie positioning fixture 38 is formed of plastic and includes a flange 39 for positioning and securing a strap 40 of a self locking cable tie 41 to tray base 21.

Corrugated fiber optic conduit 42 is a standard product utilized in the art to contain and protect fiber optic cables 28 or fibers 29 by enclosing the same while preventing movement of enclosed cables or fibers beyond their minimum bend radius which would damage the optic fibers. Conduit 42 includes a plurality of axially spaced indented radial grooves 43 that allow the desired amount of flexing of the conduit but resist undesired excessive bending of the conduit.

To facilitate the ease of connection of conduit 42 to tray 20, to provide a more secure joint between conduit 42 and tray 20 and to prevent damage to the optical fibers contained therein the present invention positions edges 34 of entry slots 32 within a radial groove 43 of conduit 42 which prevents axial movement of conduit 42 relative to tray base 21. Preferably vertical edges 34 of each entry slot 32 are spaced apart a distance slightly greater than or approximately equal to the outer diameter of the conduit in radial groove such that conduit 42 is securely held within entry slot 32 after conduit 42 is inserted between vertical edges 34. See FIGS. 6 and 7. The resiliency of conduit 42 allows some interference with edges 34 without damaging conduit Conduit 42 is then preferably securely fastened to tray base 21 with a cable tie 41 which fastens conduit 42 to cable tie positioning fixture 38. See FIG. 2.

Figure 8:
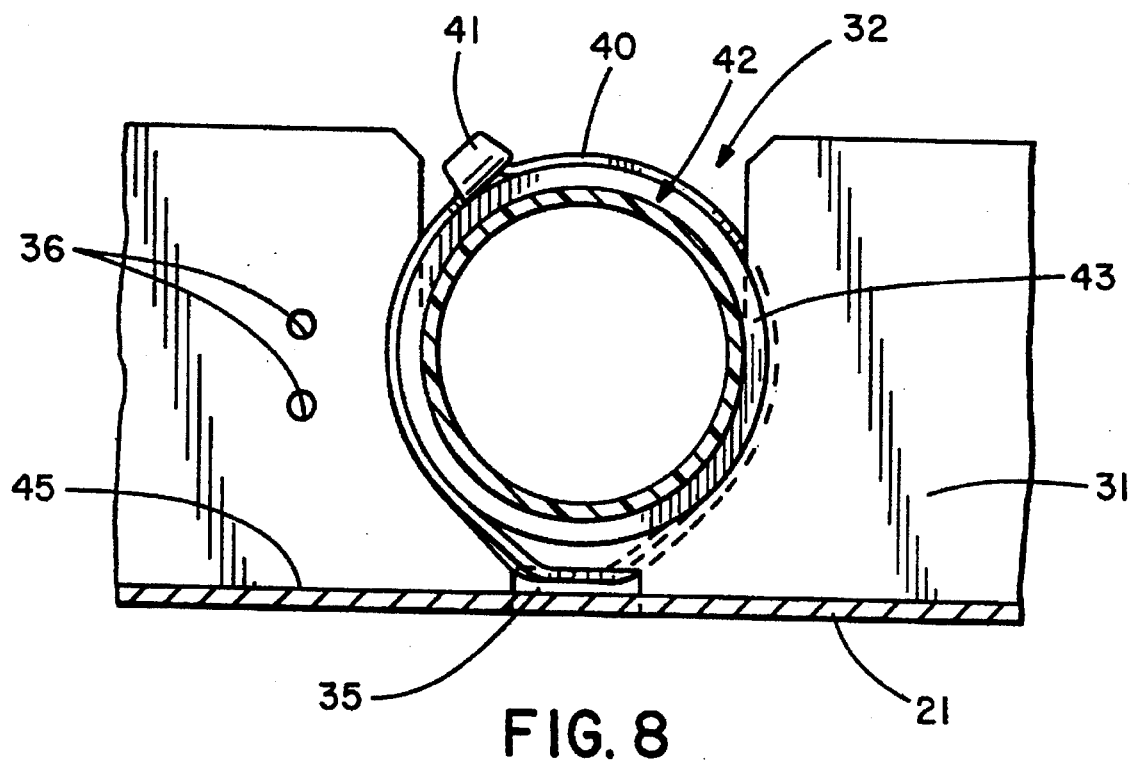
FIG. 8 is a fragmentary view showing a cable tie secured within a cable tie receiving slot for securing conduit to the tray.

An alternative way of fastening conduit 42 to base 21 of tray 20 is shown in FIG. 8, where cable tie 41 is passed through cable tie receiving slot 35 in vertical walls 30 or 31 and secured around conduit 42.

Figure 9:
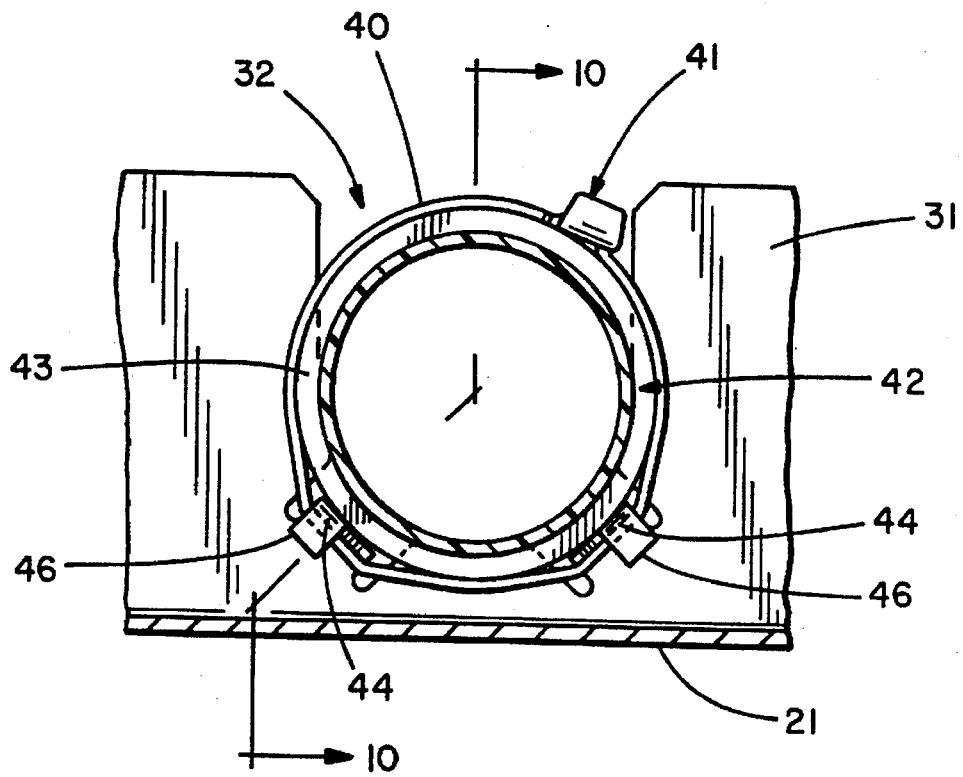
FIG. 9 is fragmentary sectional view of an alternative embodiment of conduit securing structure formed in a wall of the tray of FIG. 1.
Figure 10:
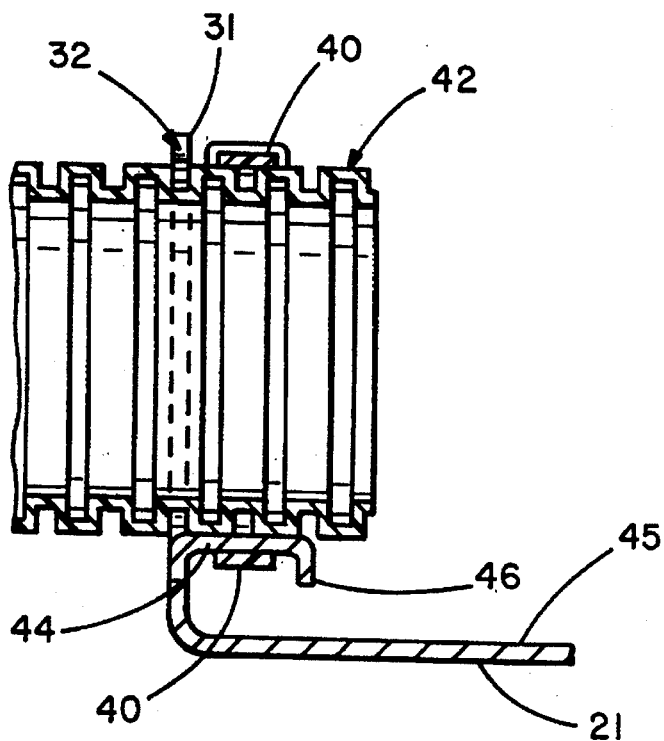
FIG. 10 is a fragmentary sectional view of the conduit securing structure of FIG. 9, taken along line 10—10 of FIG. 9.

Another means for fastening conduit 42 securely to base 21 is shown in FIGS. 9 and 10, where a plurality of tabs 44 are formed out of a portion of a vertical wall of base 21, adjacent each entry slot 32. Tabs 44 project inwardly parallel to a planar surface 45 of base 21 to present a surface for receipt of strap 40 of a cable tie 41 for fastening conduit 42 to base 21. A distal edge 46 of each tab 44 is bent downwardly toward surface 45 to retain cable tie 41 relative to tab 44.

The method of the present invention is practiced by providing a junction box or tray base 21 having an entry slot 32 in a wall 30 of base 21 and providing a fiber optic conduit 42 having a radial groove 43 sized to fit snugly within the slot and positioning the spaced apart edges 34 of entry slot 32 in one of radial grooves 43 of the conduit 42 to securely engage conduit 42 with wall 30 or 31 of base 21. An additional step of securing conduit 42 to base 21 with cable tie fastener 41 prevents inadvertent disengagement of conduit 42 from base 21 and provides strain relief thereto.

While the particular preferred embodiment of the present invention has been shown and described, it will be obvious to those skilled in the art that changes and modifications may be made without departing from the teachings of the invention.

I claim:
1. An optical fiber junction box, comprising:
a wall having an entry slot at least partially defined by spaced apart edges; and
a conduit, for enclosing an optical fiber, having a plurality of radial grooves, wherein an outer diameter of at least one of the radial grooves is approximately equal to the distance between the spaced apart edges such that the conduit is secured to the junction box when one of the radial grooves of the conduit is positioned within the spaced apart edges of the entry slot.

2. An optical fiber junction box as set forth in claim 1, including fastening means disposed adjacent the entry slot for securing a fastener around the conduit to secure the conduit to the optical fiber junction box.

3. An optical fiber junction box as set forth in claim 2, wherein the fastening means includes an elongate self locking fastener and a plastic bracket fastened to the box.

4. An optical fiber junction box as set forth in claim 2, wherein the fastening means includes an elongate self locking fastener and a cable tie receiving slot formed in the wall of the box.

5. An optical fiber junction box as set forth in claim 2, wherein the fastening means includes an elongate self locking fastener and a tab formed out of the surface of the wall of the box.

6. A method of positioning optic fibers relative to a junction box, comprising the steps of:
providing an entry slot in a wall of the box;
providing a fiber optic conduit having a plurality of radial grooves sized to fit snugly within the slot; and
positioning one of the radial grooves of the conduit between the spaced apart edges of the entry slot to securely engage the conduit with the wall of the box.

7. A method as set forth in claim 6, including the step of securing the conduit to the box with an elongate fastener.

* * * * *